United States Patent
Oh

(10) Patent No.: US 7,475,144 B2
(45) Date of Patent: Jan. 6, 2009

(54) MOBILE IP SYSTEM AND DATA ROUTING METHOD OF THE SAME

(75) Inventor: Suk Sang Oh, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 09/987,098

(22) Filed: Nov. 13, 2001

(65) Prior Publication Data

US 2002/0059433 A1 May 16, 2002

(30) Foreign Application Priority Data

Nov. 14, 2000 (KR) .............................. 2000-67333

(51) Int. Cl.
  *G06F 15/16* (2006.01)
  *G06F 15/173* (2006.01)
  *H04Q 7/20* (2006.01)
(52) U.S. Cl. .................. 709/227; 709/238; 455/466
(58) Field of Classification Search ......... 709/202–203, 709/226–231, 245; 455/466; 370/331, 328, 370/355, 401
See application file for complete search history.

(56) References Cited

U.S. PATENT DOCUMENTS

| | | | |
|---|---|---|---|
| 6,172,986 B1 * | 1/2001 | Watanuki et al. ............ 370/466 |
| 6,247,058 B1 * | 6/2001 | Miller et al. ................. 709/234 |
| 6,330,435 B1 * | 12/2001 | Lazraq et al. ............. 455/412.1 |
| 6,415,331 B1 * | 7/2002 | Ariga .......................... 709/246 |
| 6,510,144 B1 * | 1/2003 | Dommety et al. ........... 370/328 |
| 6,636,498 B1 * | 10/2003 | Leung ......................... 370/338 |
| 6,766,168 B1 * | 7/2004 | Lim ......................... 455/435.1 |
| 6,775,255 B1 * | 8/2004 | Roy ............................. 370/331 |
| 6,839,350 B1 * | 1/2005 | Inouchi et al. .............. 370/392 |
| 2002/0191562 A1 * | 12/2002 | Kumaki et al. .............. 370/331 |
| 2003/0182431 A1 * | 9/2003 | Sturniolo et al. ............ 709/227 |

FOREIGN PATENT DOCUMENTS

| EP | 0 777 396 A1 | 6/1997 |
|---|---|---|
| EP | 1094647 A2 | 4/2001 |
| EP | 1199841 A2 | 4/2002 |

* cited by examiner

*Primary Examiner*—Yasin M Barqadle
(74) *Attorney, Agent, or Firm*—Ked & Associates, LLP

(57) ABSTRACT

A mobile Internet Protocol (IP) system and a data routing method of the mobile IP system are disclosed. According to the present invention, even if a mobile node moves from a first foreign agent to a second foreign agent while it receives data packets from the first foreign agent, the first foreign agent keeps storing the data packets it its buffer, and it sends the stored data to the second foreign agent indicated in a notification message received from the mobile node. Therefore, the host does not need to retransmit the data packets to the second foreign agent again. This will greatly increase reliability of the data transmission in the IP system and can reduce the overhead of the whole system.

16 Claims, 5 Drawing Sheets

MOBILE IP SYSTEM AND DATA ROUTING METHOD OF THE SAME

This application claims the benefit of the Korean Application No. P2000-67333 filed on Nov. 14, 2000, which is hereby incorporated by reference.

BACKGROUND OF THE INVENTION

1. Field of the Invention

The present invention relates to a network system, and more particularly, to a mobile Internet Protocol (IP) system and a data routing method of the mobile IP system.

2. Discussion of the Related Art

As demands for the multimedia services of personal computers are increasing at a very drastic rate, the high-speed network systems based on the Asynchronous Transfer Mode (ATM) technology are being widely used for both of the Wide Area Networks (WAN) and Local Area Networks (LAN). In spite of such steep growth in the network technology, many people still use the Internet service. Therefore, various schemes of accommodating Internet Protocols (IP) to such high-speed networks are being suggested from many Internet Engineering Task Force (IETF) and ATM forums, and their international standards are being formed.

Additionally, in accordance with the fact that the mobile communication technology is becoming more sophisticated and advanced, the wire and wireless network systems should be able to be linked to each other or combined together for future network systems. Some of the examples of researches providing the mobility of Internet networks or ATM networks are the mobile IP of the IETF and the wireless ATM of the ATM forum and ETSI Broadband Radio Access Network (BRAN).

The Wireless ATM Working Group (WATM WG) is trying to apply the ATM technology, which was used primarily in the wire networks only, to the wireless networks, and the IETF is focusing on providing mobility of a mobile node in the wireless networks by integrating the routing protocols of the mobile node.

The IP version 4, which is used in most Internet environments, presumes that it can identify a node (host or router) by using its IP address. Therefore, in order for a node to receive data, the node must be located in the network that includes its IP address. If the location of the node changes, the data may not be able to be transmitted properly.

If a node needs to change its connecting point, the node must change its IP address. In addition, the address of the changed host must be known throughout the Internet network. However, when the location of the node is changed, it is very difficult to maintain the connectivity between its transport layer and upper layer. In addition, as the number of the mobile nodes increases, it may not be able to accommodate all the mobile nodes.

A standard scheme for providing mobility of the node in an Internet network is currently being developed by the IETF, and this is called as a mobile IP system. The mobile IP system eliminates most of the problems described above. However, when the location of the mobile node in the network is changed while the node receives the data packets, the data packets being transmitted after such change will be lost.

SUMMARY OF THE INVENTION

Accordingly, the present invention is directed to a mobile IP system and a data routing method of the mobile IP system that substantially obviate one or more problems due to limitations and disadvantages of the related art.

An object of the present invention is to provide a mobile IP system, in which a mobile node is able to receive a set of data packets safely even if the mobile node moves to another network while receiving the data packets.

Another object of the present invention is to provide a method of transmitting data in a mobile IP network, using which a mobile node is able to receive a set of data packets safely even if the mobile node moves to another network while receiving the data packets.

Another object of the present invention is to provide a data routing method of a foreign agent in a mobile IP network, using which a mobile node is able to receive a set of data packets safely even if the mobile node moves to another network while receiving the data packets.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile Internet Protocol (IP) system includes a mobile node initially linked to a first foreign network and a home agent receiving a set of data packets, which are supposed to be transmitted to the mobile node, the home agent being included in a home network of the mobile node.

Lastly, the system includes a first foreign agent initially receiving the packets from the home agent and storing them in a buffer and additionally sending the stored packets to a second foreign agent included in a second foreign network if the mobile node is moved to the second foreign network, the first foreign agent being included in the first foreign network.

In another aspect of the present invention, a method of transmitting data in a mobile IP network includes: (a) transmitting a set of data packets to a home agent of a mobile node, the mobile node being currently linked to a first foreign network having a first foreign agent; (b) sending the packets received by the home agent to the first foreign agent and storing them in a first buffer; and (c) sending a notification message to the first foreign agent if the mobile node moves to a second foreign network having a second foreign agent.

The method further includes (d) sending the packets stored in the first buffer to the second foreign agent and storing them in a second buffer if the first foreign agent receives the notification message and (e) transmitting the packets stored in the second buffer to the mobile node.

In another aspect of the present invention, a data routing method of a first foreign agent in a mobile IP network includes: (a) receiving a set of data packets and storing them in a buffer; (b) determining a mobile node to which the packets are supposed to be transmitted; (c) determining if the determined mobile node is moved to a second foreign network having a second foreign agent; and (d) transmitting the packets stored in the buffer to the second foreign agent if the mobile node is moved to the second foreign network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
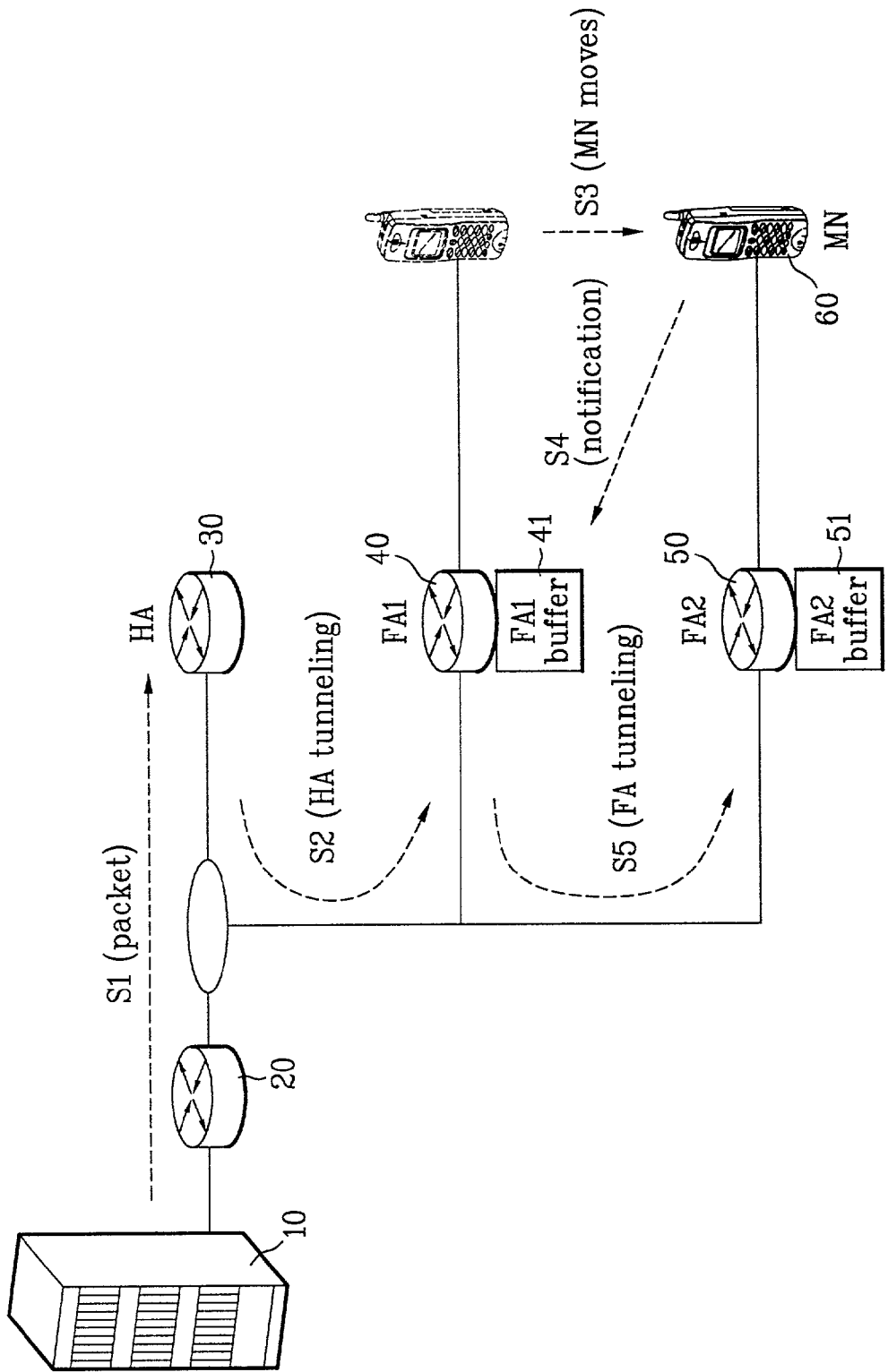
FIG. 1 illustrates a mobile Internet Protocol (IP) system according to the present invention.

FIG. 1 illustrates a mobile Internet Protocol (IP) system according to the present invention. The system includes a host 10 originally sending one or more data packets, a host agent 20, a mobile node 60 having a fixed IP address and moving from an original local network to another local network, a home agent 30 being a router of the mobile node's home network, and foreign agents 40 and 50 transmitting the IP packets to the mobile node 60.

The home agent 20 is a router of the mobile node 60's home network. It tracks the current location of the mobile node 60 and has a function of receiving the data packets for the mobile node 60 by advertising accessibility to the original IP address of the mobile node 60 throughout the network.

The foreign agents 40 and 50 are routers of the mobile node 60's foreign networks. A foreign agent, whose network is linked to the mobile node, sends the Care-Of-Address (COA) of the mobile node 60 to the home agent 30. The COA of a mobile node represents an IP address assigned to the mobile node when the mobile node is connected to a foreign network. The COA of the mobile node will change if the mobile node is connected to another foreign network. Therefore, any one of the foreign agents 40 and 50 functions as a default router of the mobile node 60, while being connected to the mobile node 60.

When data packets are transmitted from the home agent 30 to any one of the foreign agents 40 and 50, the packets passes though a tunnel. Basically, the tunnel functions as a transport channel.

In a case where the mobile node 60 stays connected to the foreign agent FA1, the host 10 initially sends one or more data packets to the home agent 30 that previously advertised accessibility of the mobile node 60. Then the home agent 30 transmits the data packets to the foreign agent FA1, which is previously registered to the home agent 30, using a tunneling method. Thereafter, the foreign agent FA1 initially stores the data packets in a first buffer 41 and sends the stored packets to the mobile node 60. If the mobile node 60 receives the packets successfully, the foreign agent FA1 deletes the data stored in the first buffer 41.

Figure 2:
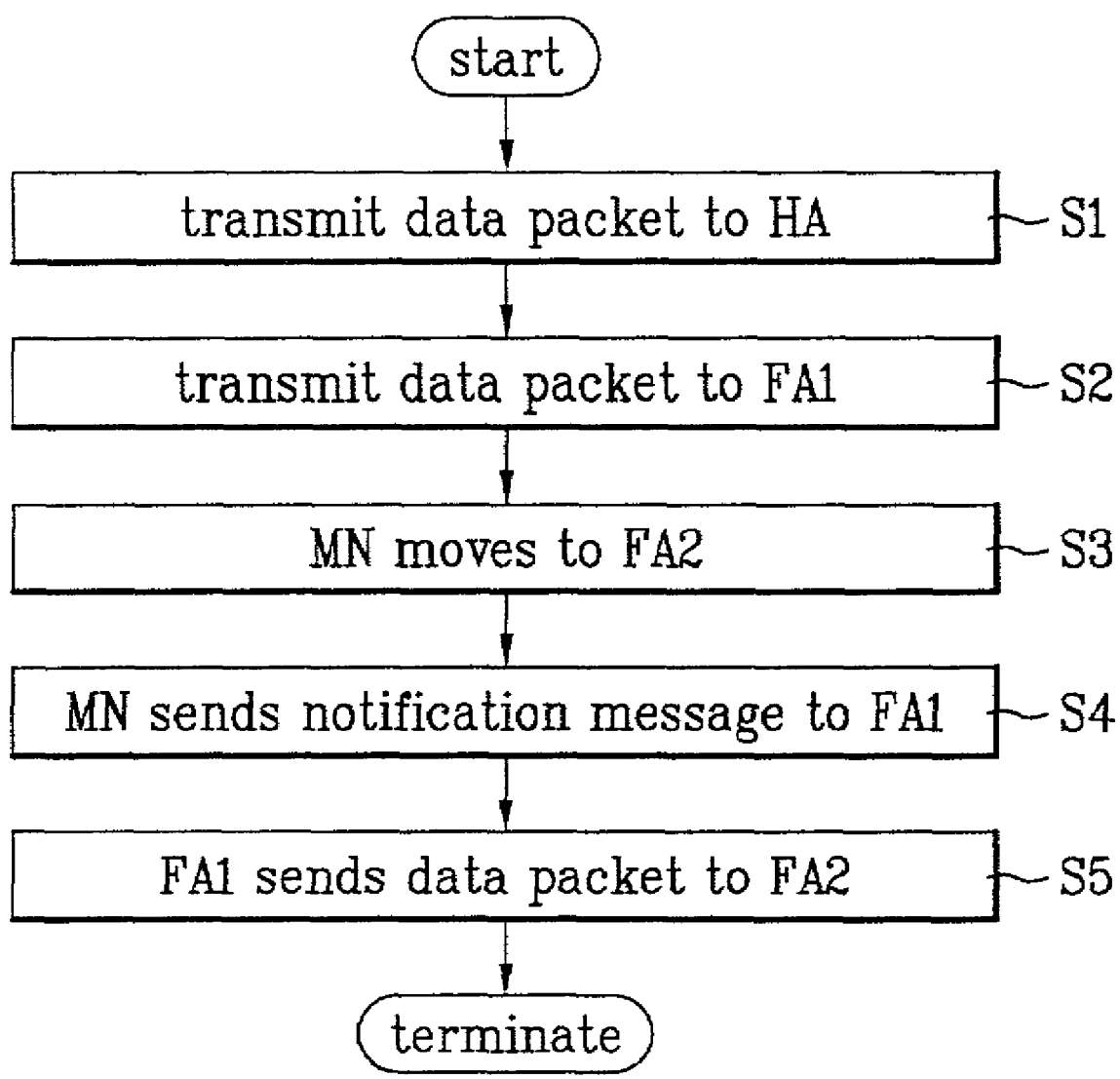
FIG. 2 illustrates a method of transmitting data in a mobile IP network in accordance with the present invention.

FIG. 2 illustrates a flow chart of transmitting data packets in the IP system according to the present invention for another case where the mobile node 60 moves from the foreign agent FA1 to the foreign agent FA2 while receiving the data packets. According to FIG. 2, the home agent 30, which previously advertised accessibility of the mobile node 60, initially receives the data packets sent by the host 10 (S1). Then, the home agent 30 sends the data packets to the foreign agent FA1, which is previously registered to the home agent 30, using a tunneling method (S2). If the mobile node 60 moves from FA1 to FA2 while the data packets are being transmitted to FA1 (S3), FA1 40 stores the data packets in the first buffer 41 and transmits the stored packets to the mobile node 60. Since the mobile node is not linked to FA1 anymore, the data transmission will not be completed successfully. However, FA1 will keep storing the data packets being sent from the home agent 30.

After the mobile node 60 moves to FA2 50, it informs the FA1 that it has moved to FA2 by sending a notification message to FA1 and registers to the home agent 30 (S4). Thereafter, FA1 sends the data stored in the buffer 41 to FA2 50 using a tunneling method (S5). Subsequently, FA2 stores the data received from FA1 in the second buffer 51 and transmits them to the mobile node 60. Lastly, the data stored the second buffer 51 are deleted.

If the mobile node 60 moves again from FA2 to another foreign agent FA3 while the data packets are being transmitted from FA1 to FA2, the steps described above will be repeated again. In other words, the mobile node will send a notification message to FA2, and FA2 will send the data stored in the second buffer 51 to FA3, and so on.

Figure 3:
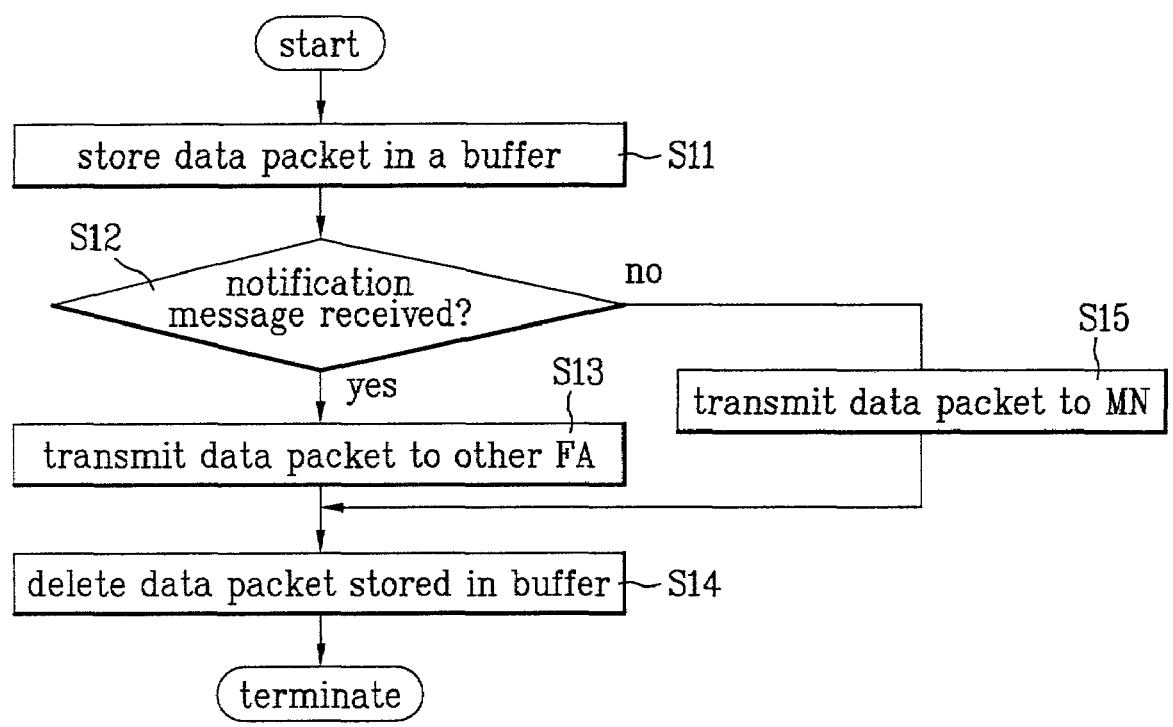
FIG. 3 illustrates a data routing method of a foreign agent in a mobile IP network in accordance with the present invention.

FIG. 3 is a flow chart illustrating the steps of processing the data received in a foreign agent having a buffer. According to the FIG. 3, when a foreign agent receives data packets, it temporarily stores them in its buffer (S11). Then it reads the data information of the data packets and checks whether there is any related notification message received from any other foreign agent (S12). If there is, it sends the data stored in its buffer to the foreign agent registered in the message (S13) and deletes the data from the buffer (S14).

On the other hand, in the other case where there is no notification message received, the foreign agent sends the data packets to the mobile node connected (S15) and deletes the data stored in the buffer (S14).

Figure 4:
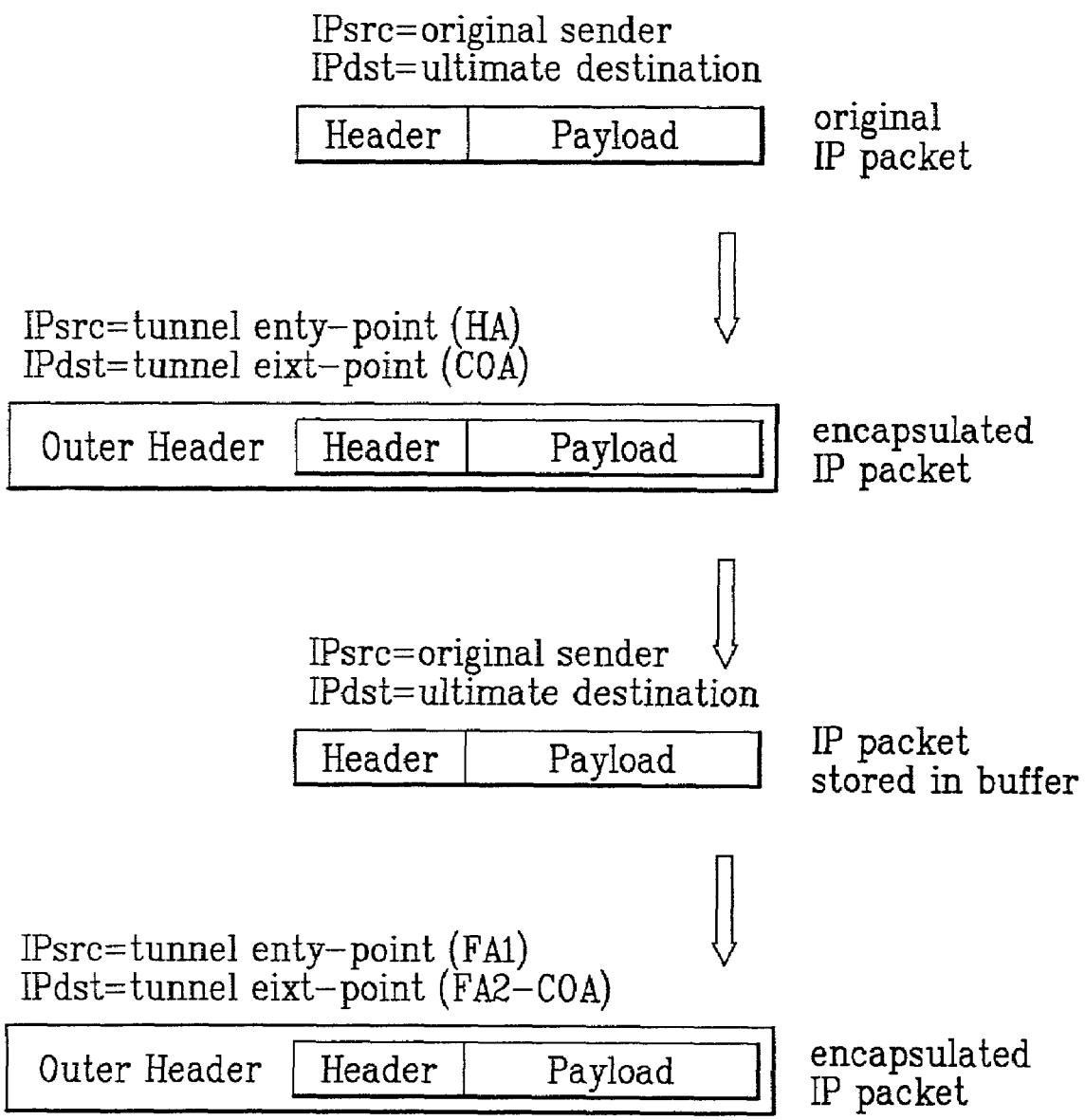
FIG. 4 illustrates the data formats of each data packet being transmitted in a mobile IP system according to the present invention.

FIG. 4 illustrates the data format of each data packet being transmitted in the IP system according to the present invention. In other words, it illustrates the data formats of an original packet being transmitted from an original sender to the home agent 30 in FIG.1, a first encapsulated IP packet being transmitted from the home agent 30 to FA1 40 using a HA tunneling method, an IP packet being stored in the buffer 41, and a second encapsulated IP packet being stored in the buffer 51.

Figure 5:
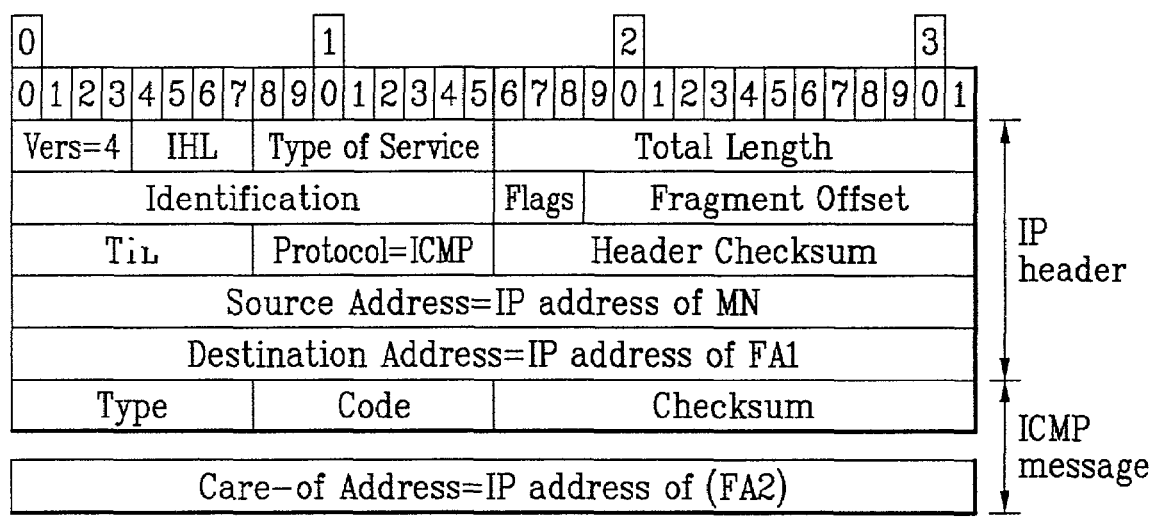
FIG. 5 illustrates the data format of a notification message sent by a mobile node in accordance with the present invention.

FIG. 5 illustrates the format of a notification message that is sent to FA1 when mobile node 60 moves from FA1 40 to FA2 50 during the data transmission. The fields of the message are divided into two parts: an IP header part and an ICMP message part. The structure of the IP header part is identical to the standard IP header, and the ICMP message part is basically follows the structure of the standard ICMP message except that it contains data-type and Care-Of-Address information bits. Each of the fields of both parts is defined as follows.

Vers: IP Version Number (i.e., Vers=4 for IPV4)

IHL: Internet Header Length in a 32 bits unit (use 5 for the present message)

Type of Service: Type of the service (use 0 (normal) for the present message)

Total Length: Total length of the IP Header and ICMP message in an 8-bit unit

Identification: Identification value (variable)

Flags: 3 bit flag linked to IP header fragmentation (use 010 for the present message)

TTL: Time to Live representing a maximum hop number of the transport channel (use 64 for the present message)

Protocol: type of the message followed after IP Header (use 1 (ICMP message) for present message)

Header Checksum: checksum value calculated using IP Header part

Source Address: IP address of a sender (IP address of the mobile node for present message)

Destination Address: IP address of a receiver

Type: indicates that the present message is a notification message

Code: set to 0

Checksum: checksum value calculated from ICMP message

Care-Of-Address: COA currently connected to the mobile node

According to the present invention, even if a mobile node moves from a first foreign agent to a second foreign agent while it receives data packets from the first foreign agent, the first foreign agent keeps storing the data packets in its buffer, and it sends the stored data to the second foreign agent indicated in a notification message sent by the mobile node. Therefore, the host does not need to retransmit the data packets to the second foreign agent again. This will greatly increase reliability of the data transmission in the IP system and can reduce the overhead of the whole system.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A mobile Internet Protocol (IP) system, comprising:
    a mobile node initially linked to a first foreign network;
    a home agent receiving a set of data packets, which are supposed to be transmitted to said mobile node, said home agent being included in a home network of said mobile node;
    a first foreign agent receiving said packets from said home agent and storing said packets in a first buffer of said first foreign agent, wherein said first foreign agent sends said stored packets to said mobile node if said mobile node continues to be linked to said first foreign network; and
    a second foreign agent receiving said packets stored in said first buffer of said first foreign agent from said first foreign agent, and the second foreign agent storing said received packets in a second buffer of said second foreign agent if said mobile node is moved to a second foreign network from said first foreign network, the packets stored in the second buffer that are received from the first buffer include packets stored in the first buffer while the mobile node is linked to the first foreign network, said second foreign agent being included in said second foreign network, wherein the first foreign agent keeps storing the data packets being sent from the home agent until the first foreign agent receives a notification message from the mobile node, and the notification message received at the first foreign agent informs the first foreign agent that the mobile node has moved to another foreign agent, and
    wherein the packets stored in the first buffer of the first foreign agent are directly sent by the first foreign agent to the second foreign agent indicated in the notification message.

2. The mobile IP system of claim 1, wherein said first foreign agent deletes said stored packets after sending said stored packets to said second foreign agent.

3. The mobile IP system of claim 1, wherein said second foreign agent deletes said stored packets after sending said stored packets to said mobile node.

4. The mobile IP system of claim 1, wherein said first buffer is coupled to said first foreign agent.

5. The mobile IP system of claim 1, wherein said first foreign agent determines whether said mobile node is moved to said second foreign network by checking whether the notification message is received from said mobile node.

6. A method of transmitting data in a mobile Internet Protocol (IP) network, the method comprising:
    transmitting a set of data packets from a host to a home agent of a mobile node, said mobile node being currently linked to a first foreign network having a first foreign agent;
    sending said packets received by said home agent to said first foreign agent and the foreign agent storing the packets in a first buffer of the first foreign agent;
    sending the stored packets by the first foreign agent to the mobile node if the mobile node continues to be linked to the first foreign network;
    moving said mobile node from the first foreign network to a second foreign network having a second foreign agent;
    sending said packets stored in said first buffer by the first foreign agent to said second foreign agent and the second foreign agent storing the received packets in a second buffer if said mobile node is moved to the second foreign network from the first foreign network, wherein the packets stored in the second buffer that are received from the first buffer include packets stored in the first buffer while the mobile node is provided in the first foreign network; and
    transmitting said packets stored in said second buffer of the second foreign agent to said mobile node,
    wherein the first foreign agent keeps storing the data packets being sent from the home agent until the first foreign agent receives a notification message from the mobile node, and the notification message received at the first foreign agent informs the first foreign agent that the mobile node has moved to another foreign agent, and
    wherein the stored packets in the first buffer of the first foreign agent are directly sent by the first foreign agent to the second buffer of the second foreign agent indicated in the notification message.

7. The method of claim 6, wherein said first buffer is coupled to said first foreign agent.

8. The method of claim 6, wherein said second buffer is coupled to said second foreign agent.

9. The method of claim 6, further comprising deleting said packets stored in said first buffer after sending said packets stored in said first buffer to said second foreign agent.

10. The method of claim 6, further comprising deleting said packets stored in said second buffer after transmitting said packets stored in said second buffer to said mobile node.

11. A data routing method at a first foreign agent of a first foreign network in a mobile Internet Protocol (IP) network, the method comprising:

receiving a set of data packets at a home agent, wherein the data packets are transmitted from a host to the home agent;

determining a mobile node to which said packets are supposed to be transmitted;

storing packets in a first buffer of the first foreign agent until a notification message is received at the first foreign agent from the mobile node, wherein the notification message received at the first foreign agent informs the first foreign agent that the mobile node has moved to another foreign agent;

sending the stored packets from the first buffer to the mobile node if the mobile node is still linked to the first foreign network;

if the mobile node is not linked to the first foreign agent, determining if said mobile node moves to a second foreign network having a second foreign agent; and sending the stored packets from the first buffer to the second foreign agent when the notification message is received at the first foreign agent from the mobile node, wherein the second foreign agent receives the packets from the first buffer of the first foreign agent and stores the packets in a second buffer of the second foreign agent after the mobile node has moved from the first foreign network to the second foreign network, and the second foreign agent transmits the stored packets in the second buffer to the mobile node, wherein the packets stored in the second buffer that are received from the first buffer of the first foreign agent include packets stored in the first buffer while the mobile node is in the second foreign network and prior to the first foreign agent receiving the notification message from the mobile node.

12. The method of claim 11, further comprising deleting said packets stored in said first buffer after sending said packets stored in said first buffer to said second foreign agent.

13. The method of claim 11, further comprising deleting said packets stored in said second buffer after transmitting said packets stored in said second buffer to said mobile node.

14. The method of claim 11, wherein said first buffer is coupled to said first foreign agent.

15. The method of claim 11, wherein said determining is performed by checking whether the notification message is received from said mobile node.

16. The method of claim 11, wherein an IP address of said second foreign agent is included in the notification message.

* * * * *